United States Patent
Wilkerson

(10) Patent No.: US 11,161,154 B2
(45) Date of Patent: Nov. 2, 2021

(54) EARTH EQUIPMENT MAINTENANCE TOOL

(71) Applicant: Texas Toothpick, LLC, Lumberton, TX (US)

(72) Inventor: Michael Wilkerson, Lumberton, TX (US)

(73) Assignee: Texas Toothpick, LLC, Lumberton, TX (US)

( * ) Notice: Subject to any disclaimer, the term of this patent is extended or adjusted under 35 U.S.C. 154(b) by 416 days.

(21) Appl. No.: 16/262,368

(22) Filed: Jan. 30, 2019

(65) Prior Publication Data

US 2020/0238956 A1 Jul. 30, 2020

(51) Int. Cl.
*E02F 3/14* (2006.01)
*B08B 9/00* (2006.01)
*B08B 1/00* (2006.01)
*B60S 3/00* (2006.01)

(52) U.S. Cl.
CPC ............... *B08B 1/005* (2013.01); *B08B 9/00* (2013.01); *E02F 3/144* (2013.01); *B60S 3/00* (2013.01)

(58) Field of Classification Search
CPC .. B08B 1/005; B08B 9/00; B08B 9/08; B08B 9/0808; B08B 9/087; B08B 9/38; B08B 13/00; B60S 3/00; B60S 3/04; B60S 3/045; B60S 5/00; E02F 3/144; E02F 3/407; E02F 3/656; E02F 3/968
USPC ............................. 15/236.01, 236.05–236.09
See application file for complete search history.

(56) References Cited

U.S. PATENT DOCUMENTS

| | | | | |
|---|---|---|---|---|
| 925,259 | A * | 6/1909 | Ziegler | 15/236.01 |
| 1,336,595 | A * | 4/1920 | Stahl | E02F 3/144 |
| | | | | 198/705 |
| 1,473,143 | A * | 11/1923 | Dean | A01B 15/16 |
| | | | | 15/236.01 |
| 4,380,840 | A * | 4/1983 | Rieckenberg | A47L 17/06 |
| | | | | 15/105 |
| 4,574,417 | A * | 3/1986 | Magnasco | A47L 13/08 |
| | | | | 15/236.05 |
| 5,033,156 | A * | 7/1991 | Stewart | B28C 5/4203 |
| | | | | 15/236.05 |
| 5,345,642 | A * | 9/1994 | Faldetta | A47L 13/08 |
| | | | | 15/105 |
| 5,491,868 | A * | 2/1996 | Baggenstos | A47L 13/08 |
| | | | | 15/236.01 |
| 5,624,145 | A * | 4/1997 | Swilley | A47L 17/06 |
| | | | | 15/236.07 |
| 5,799,997 | A * | 9/1998 | Lehn | A47L 13/022 |
| | | | | 15/236.07 |
| 6,575,511 | B2 * | 6/2003 | Hultstrand | B60S 3/045 |
| | | | | 15/105 |
| 6,581,994 | B2 * | 6/2003 | Stevenson | B08B 1/00 |
| | | | | 15/236.07 |
| 7,103,936 | B1 * | 9/2006 | Brandon | B27G 17/04 |
| | | | | 15/236.05 |

(Continued)

*Primary Examiner* — Mark Spisich
(74) *Attorney, Agent, or Firm* — Lewis & Reese, PLLC

(57) ABSTRACT

The disclosed invention facilitates the removal of dirt and other sediment from a bucket of heavy machinery. With regular use, buckets build up dirt that decreases the available volume. Removing the dirt can require additional equipment and labor, and would require the heavy machinery to be away from the service area. The disclosed invention allows for rapid removal of the dirt on site with a single piece of equipment.

19 Claims, 5 Drawing Sheets

(56) References Cited

U.S. PATENT DOCUMENTS

| | | | | |
|---|---|---|---|---|
| 9,072,410 B2* | 7/2015 | Sorenson | ............... | A47J 43/288 |
| 2017/0189946 A1* | 7/2017 | Beardsley | ............... | B08B 9/087 |

* cited by examiner

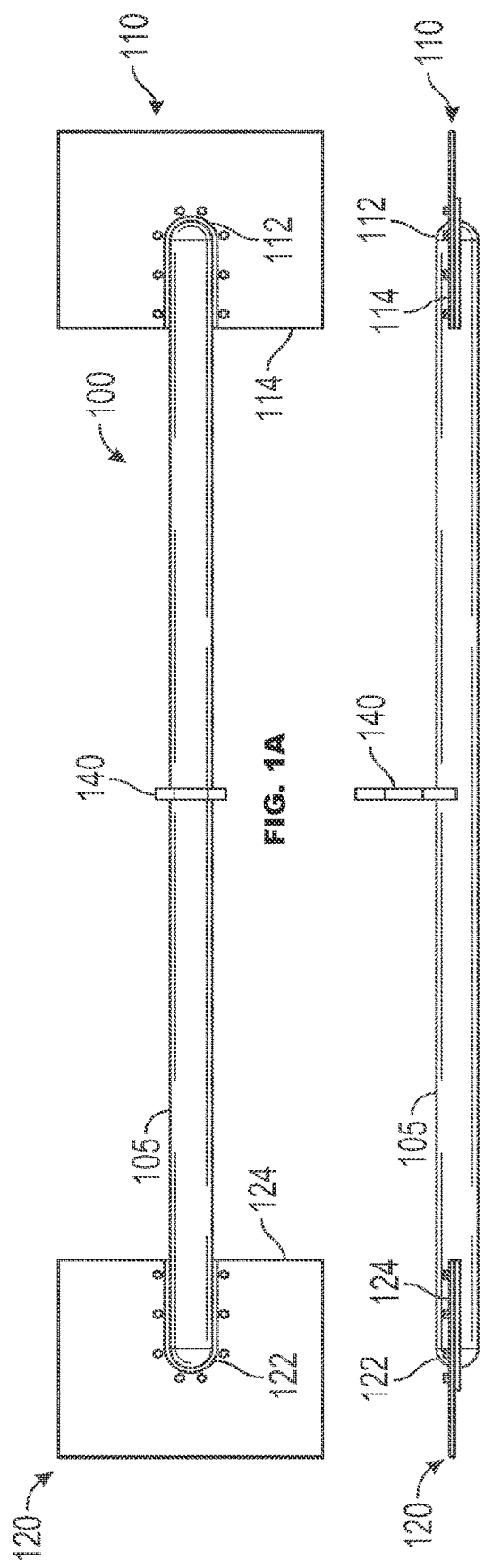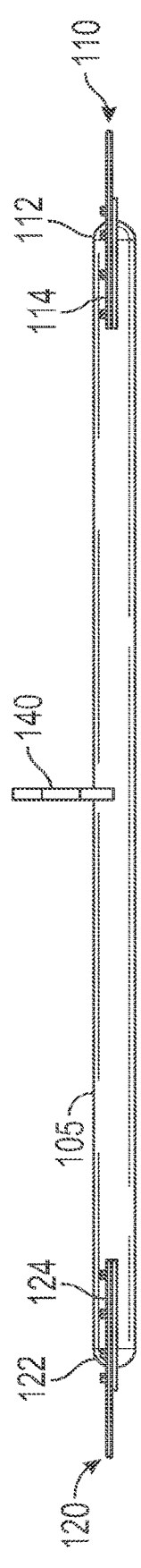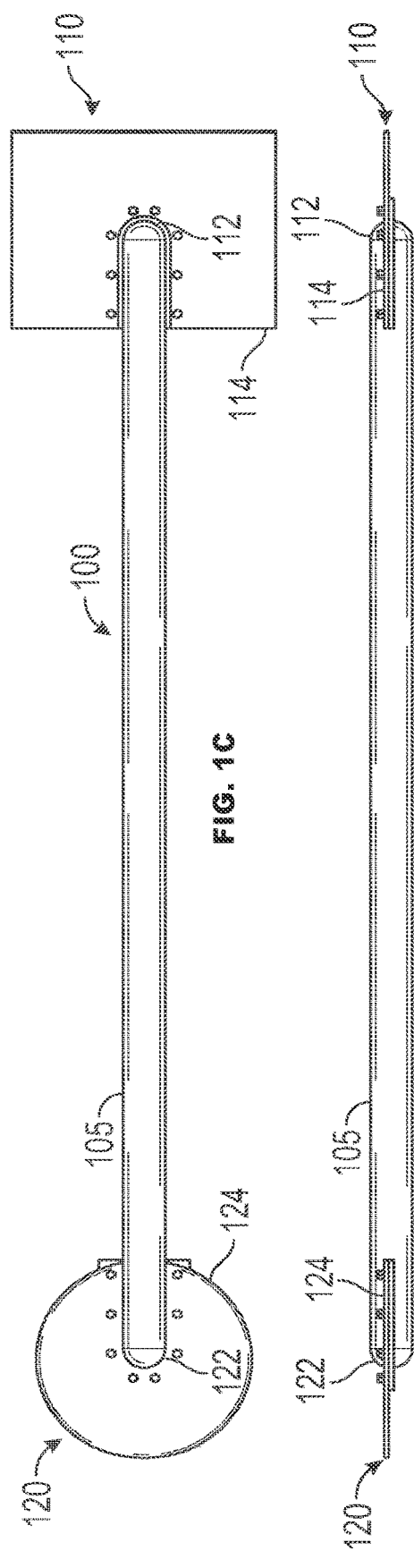

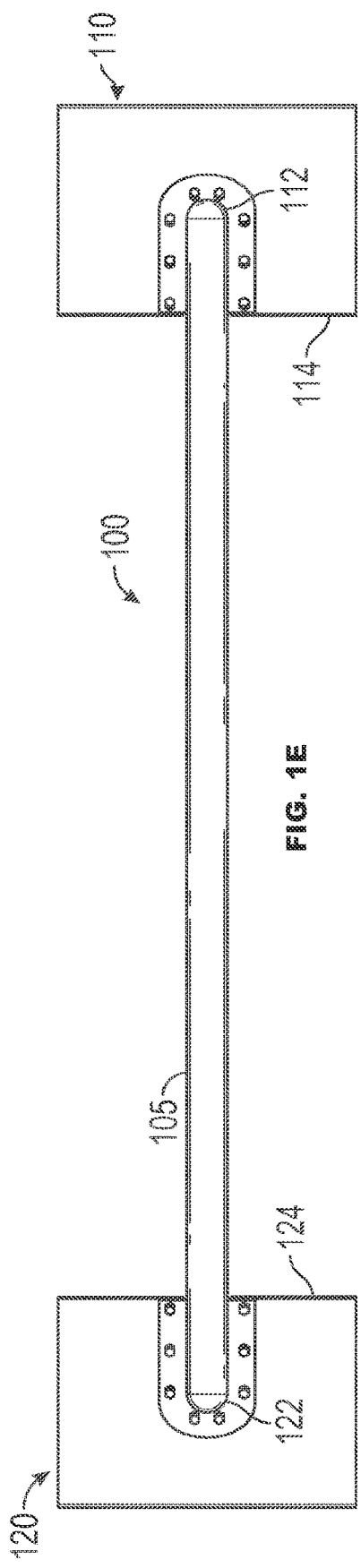

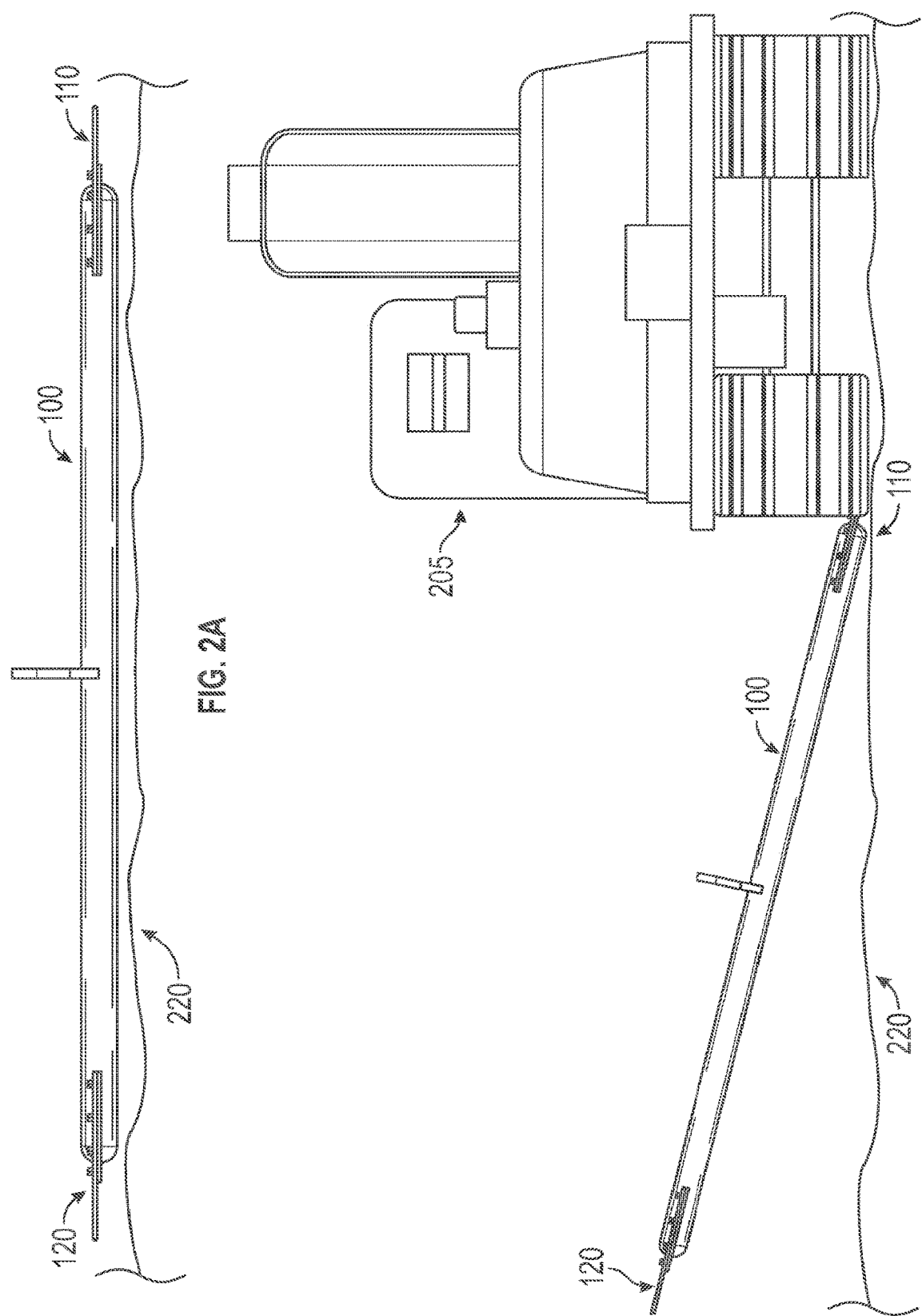

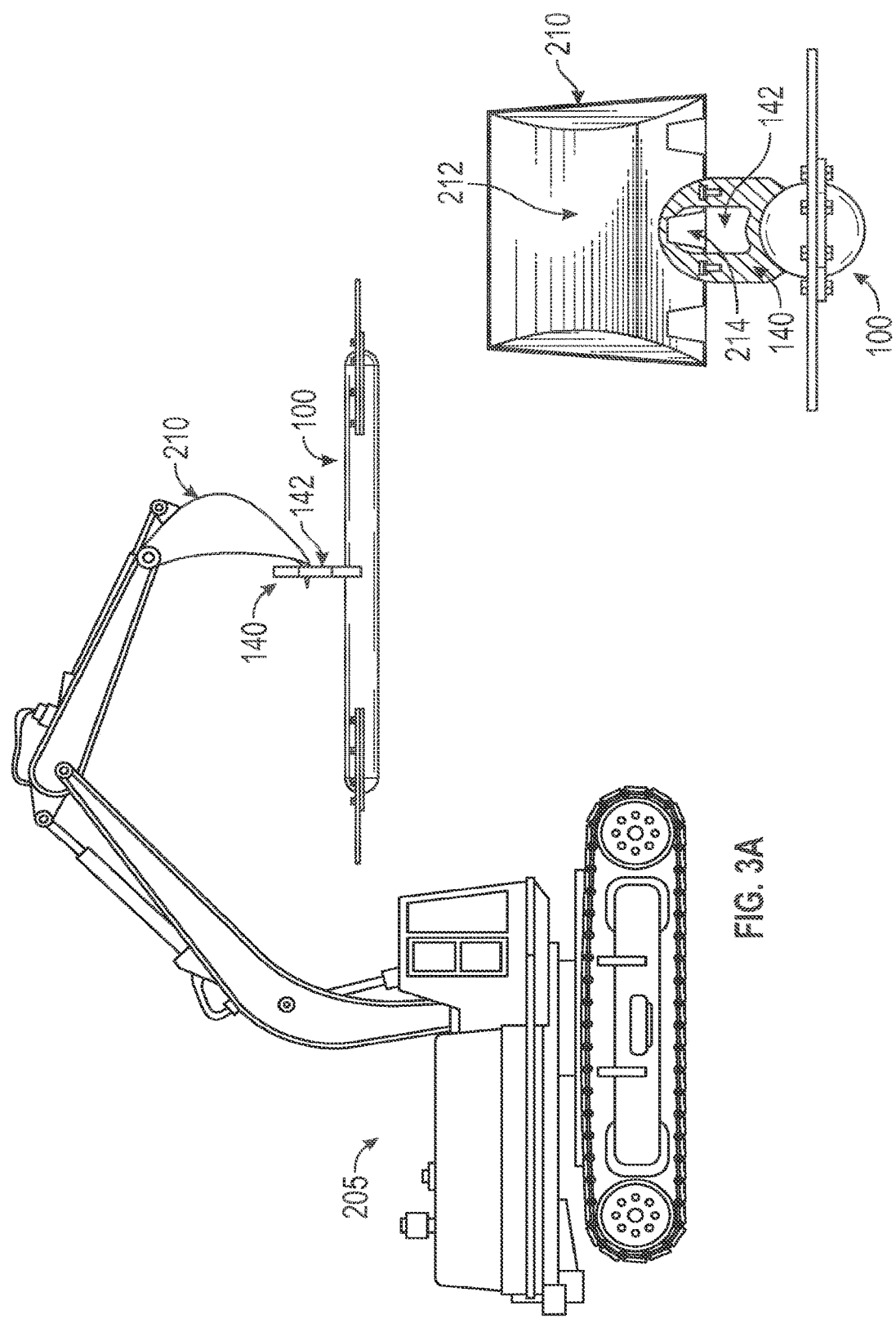

EARTH EQUIPMENT MAINTENANCE TOOL

FIELD OF THE INVENTION

The invention relates to the maintenance of earth moving equipment, particularly those with buckets.

BACKGROUND OF THE INVENTION

A common issue with earth moving equipment involves the removal of soil and other accumulations in the bucket. In many soil types, the soil and other debris accumulates slowly over time, reducing the production of the equipment by decreasing the available volume to move additional soil.

A common method to reduce accumulation in a bucket is to wash the bucket interior, typically under pressure. This method requires a pressure washer, manual labor, and an adequate water supply which is not always be available at a work site. Another method involves using a local fixed object like a tree stump as a pick. With a fixed object in the area, the vehicle will position itself next to the object and orient the bucket to where the bucket interior interacts with the object. However, these objects might not be the optimum shape to clean the bucket interior, requiring additional operations.

These solutions to the accumulation problem are not ideal, leading to a need for a better way to accomplish this goal.

BRIEF SUMMARY OF INVENTION

The invention is a cleaning device used to remove deposits from earth moving equipment. The invention in an exemplary embodiment comprises a pipe with adaptors at both ends of the pipe. The weight of the vehicle positions the cleaning device so the scraper adaptor can interact with the bucket interior. By keeping the cleaning device stationary and moving the bucket into position, the accumulation in the bucket can be removed with minimal time and without the use of any liquids or leaving the location.

DETAILED DESCRIPTION OF DRAWINGS

FIGS. 1A and 1B show a top down and side view, respectively, of the cleaning device 100 with an identical load adaptor 110 and scraper adaptor 120 in an exemplary embodiment.

FIGS. 1C and 1D show a top down and side view, respectively, of the cleaning device 100 with a load adaptor 110 and scraper adaptor 120 of different shapes in an exemplary embodiment.

FIGS. 1E and 1F show a top down and side view, respectively, of the cleaning device 100 from FIG. 1, wherein the pipe 105 is bent in an exemplary embodiment.

FIG. 2A is a simplified diagram of the cleaning device 100 in an unused position on the ground 220 in an exemplary embodiment.

FIG. 2B is a simplified diagram of the cleaning device 100 from FIG. 2A acted on by a vehicle 205 in an exemplary embodiment.

FIG. 3A is a drawing showing the cleaning device 100 being moved in an exemplary embodiment.

FIG. 3B is a drawing showing the cleaning device 100 coupled to a bucket 210 in FIG. 3A.

DETAILED DESCRIPTION OF EXEMPLARY EMBODIMENTS

Figure 2C:
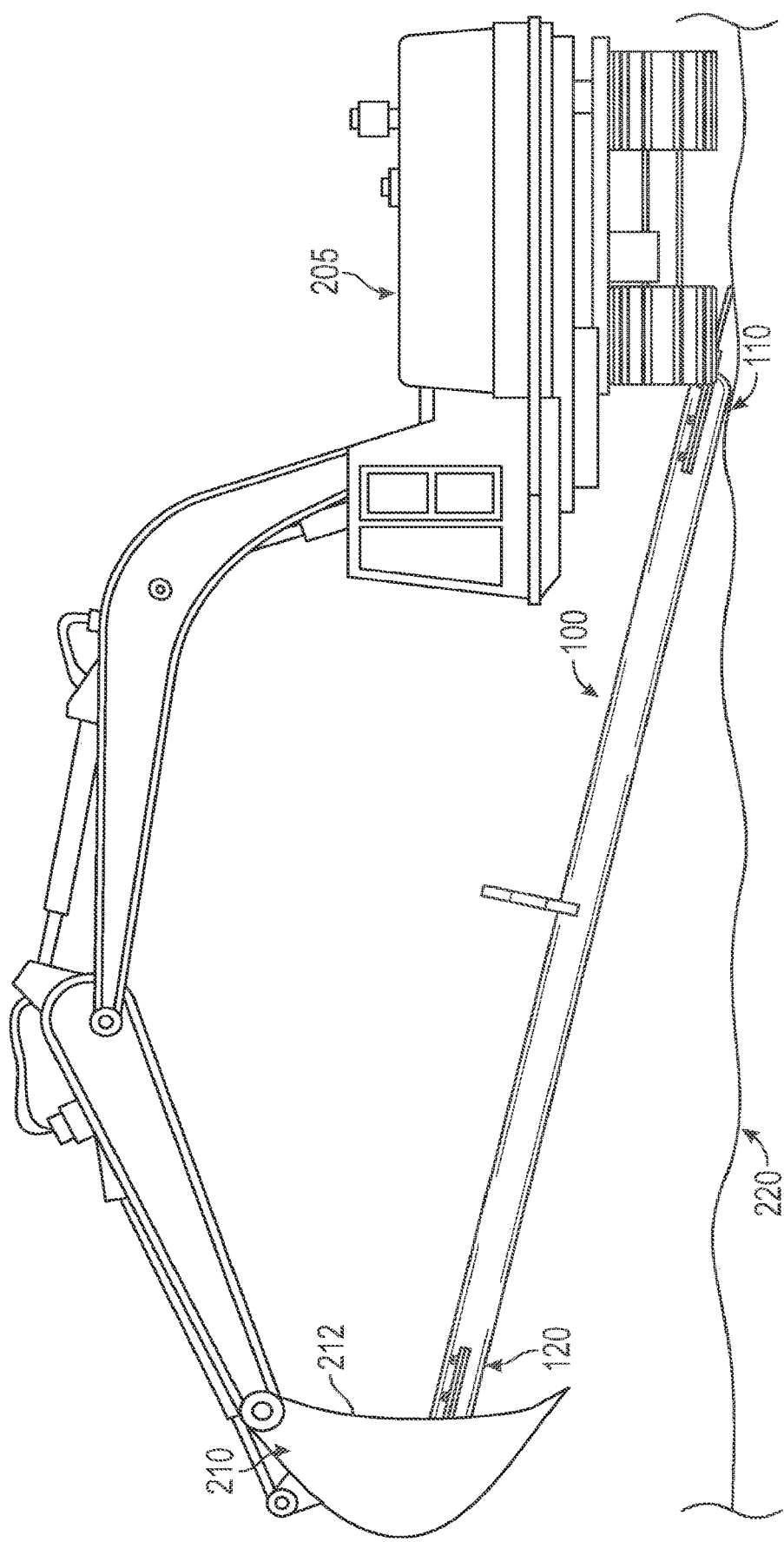
FIG. 2C is a simplified diagram of the cleaning device 100 from FIG. 2B where the bucket 210 is being cleaned in an exemplary embodiment.

The cleaning device 100 consists of a pipe 105 with an load adaptor 110 on the first end and a scraper adaptor 120 on the second end. In the exemplary embodiment, the load adaptor 110 and scraper adaptor 120 are identical, but may be different in alternative embodiments. The load adaptor 110 comprises a load cap 112 and a load plate 114. The scraper adaptor 120 comprises a scraper cap 122 and a scraper plate 124. The load adaptor 110 and the scraper adaptor 120 in the exemplary embodiment are rectangular plates of metal that extend away from the pipe 105.

In operations as shown in FIGS. 2A-C, the cleaning device 100 is placed level on the ground 220, where both the load adaptor 110 and the scraper adaptor 120 are flat on the ground 220. As the vehicle 205 rolls over the load adaptor 110, the load adaptor 110 is pushed into the ground 220 beneath the vehicle 205. The surrounding ground 220 acts as a fulcrum, causing the opposite end of the cleaning device 100 with the scraper adaptor 120 to rise off the ground 220. The force of the vehicle 205 pushing down on the load adaptor 110 of the cleaning device 100 also holds the cleaning device 100 in place, making it resistant to movement as long as the vehicle 205 rests on it.

The cleaning device 100 may now work with the bucket 210 as it is now fixed with respect to the vehicle 205. The scraper adaptor 120 is now above the ground 220 with the scraper adaptor 120 parallel to the orientation of the bucket 210, which is also parallel to the ground 220. The vehicle 205 then positions the bucket 210 so that the scraper adaptor 120 will enter the bucket 210. The bucket 210 acts on the scraper adaptor 120, pushing the scraper adaptor 120 against the bucket interior 212. As the bucket 210 moves, the scraper plate 124 moves with respect to the bucket interior 212, pushing the debris loose and out of the bucket 210.

With the debris removal completed, the bucket 210 moves away from the scraper adaptor 120, freeing the cleaning device 100 to lower as needed. The vehicle 205 then moves off the load adaptor 110, causing the cleaning device 100 to return to the level of the ground 220.

In an alternative embodiment shown in FIG. 2B, the load adaptor 110 and the scraper adaptor 120 may be in different shapes. In an alternative embodiment, the load plate 114 may remain rectangular, while the scraper plate 124 may be curved or oriented at a different angle to facilitate a particular scraping techniques.

In a further alternative embodiment shown in FIGS. 1E and 1F, cleaning device 110 uses a bent pipe 105. While the cleaning device 100 would remain flat on the ground 220 when not in use, the load plate 114 might be in a non-parallel orientation to the ground 220. As the vehicle 205 rolls onto the cleaning device 100, the load plate 114 is forced to rotate under the weight of the vehicle 205. This causes the cleaning device 100 to rotate. As the rotation occurs, the level of the scraper adaptor 120 is impacted by both the load of the vehicle 205 on the load plate 114 and the bend in the pipe 105. This may lower or raise the position of the scraper adaptor 120 as applicable. In operations, the cleaning device 110 may be used as previously described, but may result in the scraper adaptor 120 being at a different height per the design.

In alternative embodiment in FIGS. 1A and 1B, the scraper may have a transportation projection 140 with a transportation eye 142 dimensioned to accommodate the teeth 214 of bucket 210, allowing the vehicle 205 to transport the cleaning device 100 as shown in FIGS. 3A-3B. The vehicle 205 uses the teeth 214 of the bucket 210 to interface with the transport eye 142. The bucket 210 then raises up and the vehicle 205 moves the cleaning device 100 as needed.

One of skill in the art will appreciate that embodiments of the invention provide an improved device for the cleaning of excavation and earth moving equipment. Although specific embodiments are illustrated and described herein, it will be appreciated by those of ordinary skill in the art that any arrangement which is calculated to achieve the same purpose can be substituted for the specific embodiments shown. This specification is intended to cover any adaptations or variations of embodiments. In particular, one of skill in the art will appreciate that the names and terminology are not intended to limit embodiments. Furthermore, additional apparatus can be added to the components, functions can be rearranged among components, and new components corresponding to future enhancements and future physical devices used in embodiments can be introduced without departing from the scope of the invention. The terminology used in this application is intended to include all embodiments and alternatives which provide the same functionality as described herein.

The invention claimed is:

1. An apparatus for cleaning a cavity of a bucket of an excavation vehicle, comprising:
    an elongate support having first and second opposed ends,
    a load plate attached to and extending from the first end of the support, and
    a scraper plate attached to and extending from the second end of the support,
    a projection with an aperture provided on and laterally extending from the support between the first and second ends of the support,
    wherein the apparatus is configured so that when the vehicle applies a force to the load plate the scraper plate is elevated so that the bucket can move such that the scraper plate interfaces with the cavity of the bucket and movement of the bucket relative to the scraper plate removes material from the cavity of the bucket.

2. The apparatus of claim 1, wherein:
    the load plate is attached to the first end of the support via a first cap that is configured to enclose the first end of the support.

3. The apparatus of claim 1, wherein:
    the scraper plate is attached to the second end of the support via a second cap that is configured to enclose the second end of the support.

4. The apparatus of claim 1, wherein the load plate and the scraper plate are different sizes.

5. The apparatus of claim 1, wherein the aperture of the projection is configured to receive at least one tooth of the bucket to transport the apparatus.

6. The apparatus of claim 1, wherein the load plate and scraper plate are the same shape.

7. The apparatus of claim 1, wherein the load plate and scraper plate are different shapes.

8. The apparatus of claim 1, wherein the elongate support comprises a pipe.

9. The apparatus of claim 1, wherein the elongate support comprises a bend.

10. A method of cleaning a cavity of a bucket of an excavation vehicle, the method comprising:
    providing an apparatus comprising:
        an elongate support having first and second opposed ends,
        a load plate attached to and extending from the first end of the support, and
        a scraper plate attached to and extending from the second end of the support,
    positioning the apparatus on the ground,
    using the vehicle to apply a force to the load plate, thereby elevating the scraper plate,
    contacting the scraper plate with the cavity of the bucket, and
    moving the bucket relative to the scraper plate to remove material from the cavity of the bucket.

11. The method of claim 10, wherein the load plate is attached to the first end of the support via a first cap that is configured to enclose the first end of the support.

12. The method of claim 10, wherein the scraper plate is attached to the second end of the support via a second cap that is configured to enclose the second end of the support.

13. The method of claim 10, wherein the load plate and the scraper plate are different sizes.

14. The method of claim 10, wherein the apparatus further comprises a projection with an aperture provided on and laterally extending from the support between the first and second ends of the support.

15. The method of claim 14, wherein the aperture of the projection is configured to receive at least one tooth of the bucket to transport the apparatus.

16. The method of claim 10, wherein the load plate and scraper plate are the same shape.

17. The method of claim 10, wherein the load plate and scraper plate are different shapes.

18. The method of claim 10, wherein the elongate support comprises a pipe.

19. The method of claim 10, wherein the elongate support comprises a bend.

* * * * *